United States Patent

Harris et al.

[15] 3,661,443

[45] May 9, 1972

[54] 100 MEGAHERTZ BANDWIDTH MODULATOR DRIVER

[72] Inventors: William C. Harris, Oxford, Conn.; Frank A. Magnante, Yorktown Heights, N.Y.

[73] Assignee: The United States of America as represented by the Secretary of the Air Force

[22] Filed: Aug. 7, 1970

[21] Appl. No.: 61,888

[52] U.S. Cl. ..........................350/160 R, 250/199, 330/55, 350/161

[51] Int. Cl. ........................................G02f 1/28, H03f 3/26

[58] Field of Search............350/160, 161; 250/199; 330/20, 330/54, 55

*Primary Examiner*—Ronald L. Wilbert

*Assistant Examiner*—V. P. McGraw

*Attorney*—Harry A. Herbert, Jr. and George Fine

[57] ABSTRACT

A modulator driver apparatus for controlling a crystal-modulated optical beam utilizing a push pull distributed amplifier to achieve wideband operation and a power gain sufficient to operate the modulator.

1 Claim, 2 Drawing Figures

INVENTORS
WILLIAM C. HARRIS,
FRANK A. MAGNANTE
BY Harry A. Herbert Jr. and George Fine
ATTORNEYS INVENTORS.
WILLIAM C. HARRIS,
FRANK A. MAGNANTE
BY Harry A. Herbert Jr. and George Fine
ATTORNEYS

100 MEGAHERTZ BANDWIDTH MODULATOR DRIVER

BACKGROUND OF THE INVENTION

This invention relates broadly to a broadband modulator driver and in particular to a solid-state push-pull distributed amplifier operating in the Class A mode.

In the prior art, the wide-band operation of high power, high frequency transistors has always been a difficult problem. The intrinsic characteristics of a transistor together with its parasitic elements are the main limiting factors. However, high frequency transistors are generally small in size to keep the parasitic factors to a minimum and thereby have a corresponding lower power handling capability. In order to construct a high-power, high-frequency transistor-amplifier circuit, a plurality of transistors need to be combined so that each delivers a portion of the total power to the load. A well known arrangement for accomplishing this combination in a transistor-amplifier is to connect the transistors in parallel with the like terminals of the respective transistors coupled together, operating the paralleled combination as one high power unit. This approach is somewhat like that used in paralleling vacuum tubes. Transistors, however, are unlike vacuum tubes in that they have a relatively low input impedance which is a function of instantaneous signal level and which varies with individual transistors. A paralleled transistor-amplifier will exhibit unequal power distribution among the various transistor devices due to the unequal input impedance. A transistor with low base-to-emitter impedance tends to draw more current than one with a high base-to-emitter impedance. This unequal current and voltage distribution across the base-to-emitter causes a correspondingly unequal power distribution, reducing therefore the parallel efficiency of the amplifier, and also in many cases resulting in the destruction of one or more of the devices.

SUMMARY OF THE INVENTION

The present invention utilizes a solid state distributed amplifier which is operated in the class A mode to provide the modulating voltage to an optical beam modulation crystal. In order to have proper operation of the beam modulation crystal, the amplitude which it receives must be sufficient to achieve 75 percent of full modulation and the bandwidth must have a range from DC to 100 Megahertz. The distributed amplifier which is operated in a push-pull configuration to achieve the required voltage levels provide the wideband operation and power gain consistent with the requirements of the modulator.

It is one object of the invention, therefore, to provide a 100 Megahertz modulator driver apparatus utilizing a common base output transistor driver to avoid the large Miller input loading which occurs with a common emitter output stage.

It is another object of the invention to provide a 100 Megahertz modulator driver apparatus having a bandwidth from DC to 100 Megahertz.

It is still another object of the invention to provide a 100-Megahertz modulator driver apparatus utilizing low level transistors to drive the output of the amplifiers to provide isolation between the input and output.

It is yet another object of the invention to provide a 100 Megahertz modulator driver apparatus utilizing a common base output stage to provide a higher output impedance to prevent loading and losses in the output.

These and other advantages, objects and features of the invention will become more apparent from the following detailed description when taken in conjunction with the illustrative embodiments in the accompanying drawings.

DESCRIPTION OF THE PREFERRED EMBODIMENT

Figure 1:
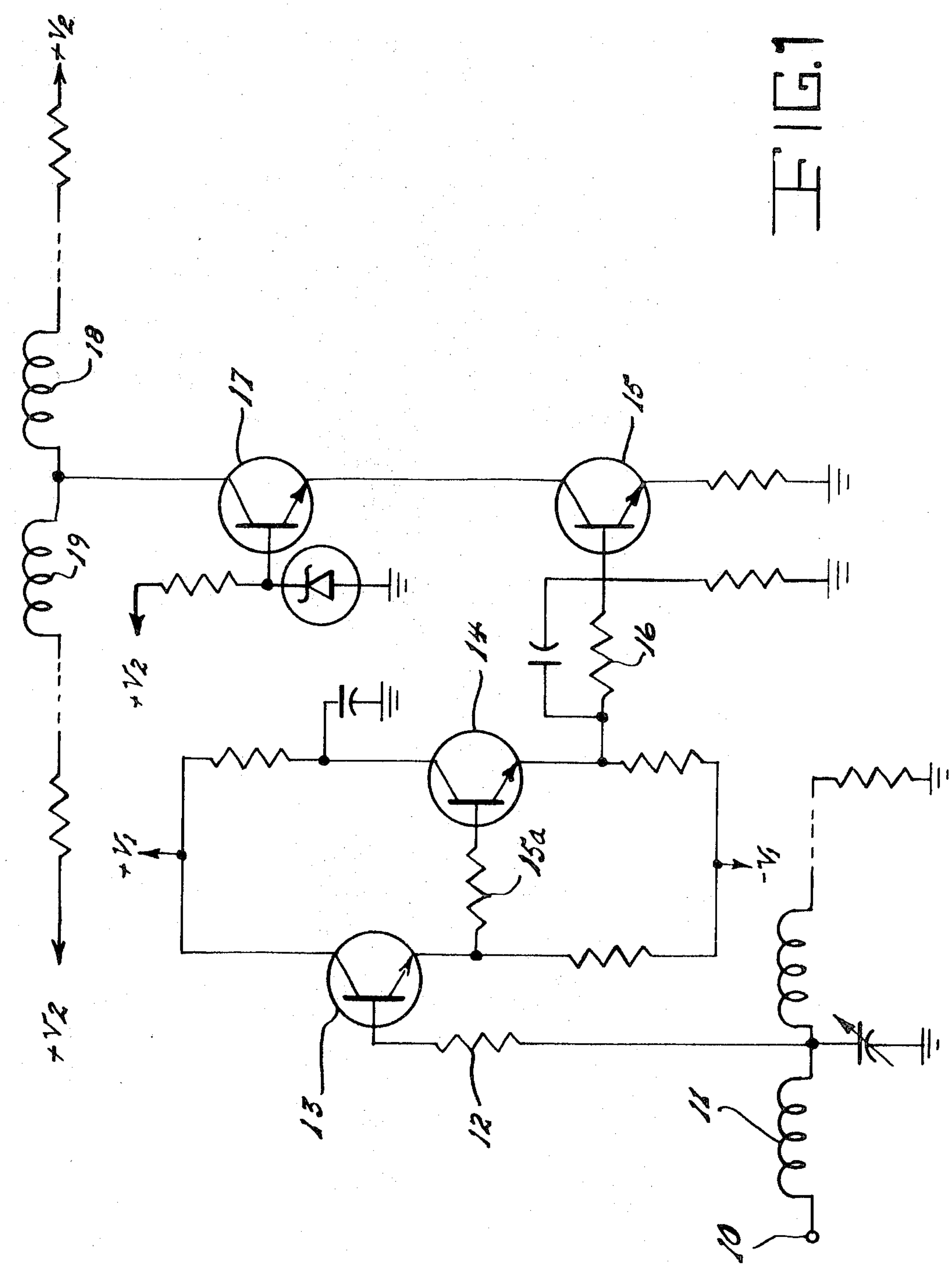
FIG. 1 is a schematic diagram of a single stage of the solid state distributed amplifier utilized in the 100 Megahertz modulator driver.

Referring now to FIG. 1, there is shown a single stage of a transistorized distributed amplifier having an input 10 connected to distributed line section 11. A signal which is received at input 10 is applied through distributed line section 11 and resistor 12 to the base of transistor 13. The signal is then applied through resistor 15*a* to the base of transistor 14. Transistor 15 which received the signal by way of resistor 16 amplifies the signal and transmits the signal to transistor 17. The signal is connected by transistor 17 to distributed line section 18, 19. A distributed amplifier is utilized to achieve both large gain and bandwidth. This is realized by the fact that the gains of each stage of the distributed amplifiers are summed rather than multiplied as in a cascaded amplifier. The bandwidth can be as high as the individual sections permit. The cutoff frequency of the lumped transmission line should be high enough so that it does not deteriorate the bandwidth. Practically, the gain is limited by the input impedance of the sections which cause losses in the base line. In order to eliminate reflections, half of the available power must be dissipated at the sending end of the collector distributed line.

The use of a common base output transistor driver 17 by a common emitter amplifier 15 avoids the large Miller input loading that would be present with a common emitter output stage, while retaining its desirable gain bandwidth product. The common base output stage 17 also provides a higher output impedance, which results in less loading and smaller losses in the output line. The low level transistors 13, 14 which drive the output portion of the individual amplifier sections provide isolation between the input and output lines, and in particular, avoid loading of the input line.

Figure 2:
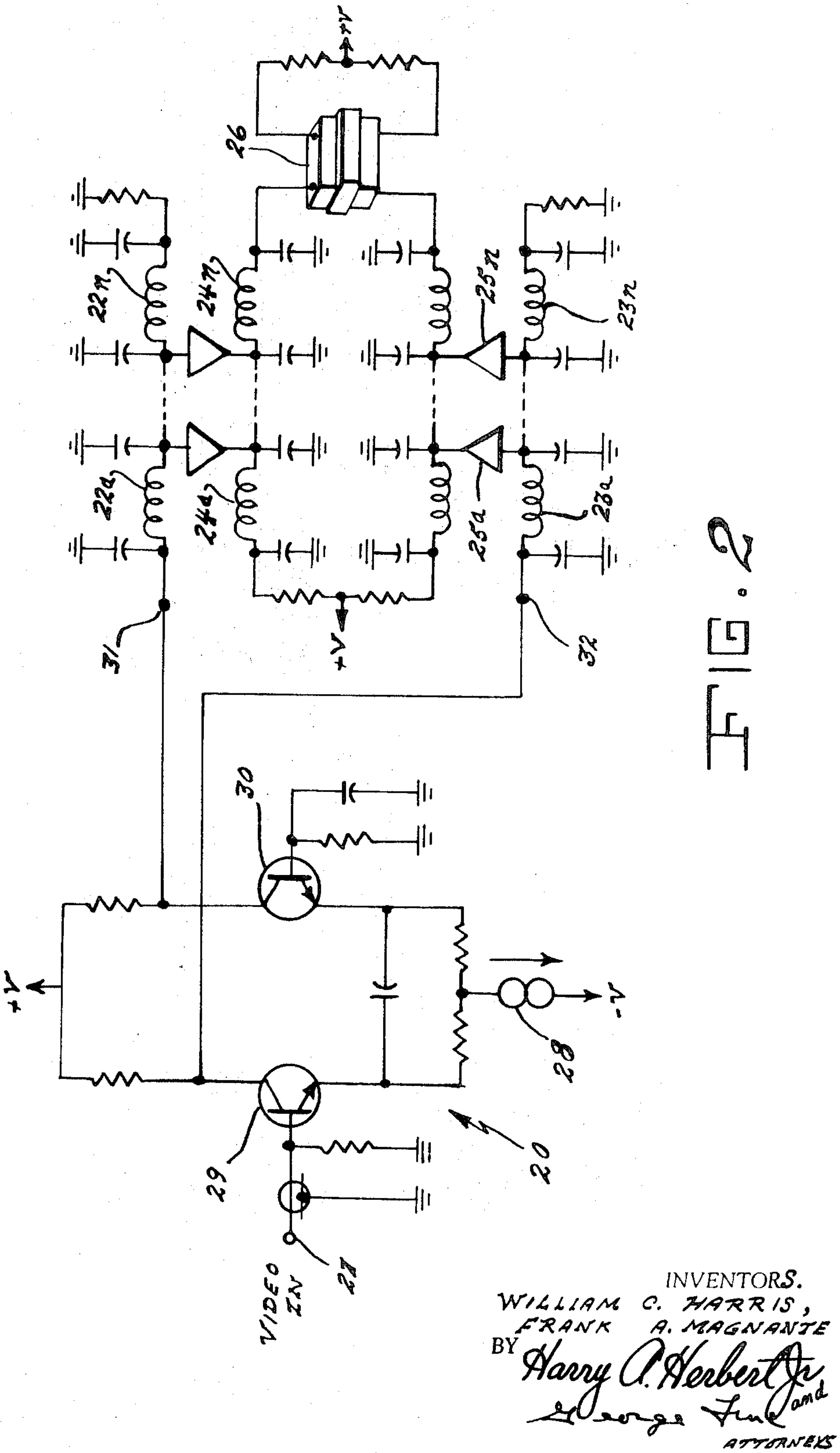
FIG. 2 is a schematic diagram of the 100 Megahertz modulator driver apparatus in accordance with this invention.

Turning now to FIG. 2, there is shown a complete 100-Megahertz modulator driver apparatus utilizing a push-pull amplifier network 20 as the input stage which operates in the class A mode to drive distributed lines 22*a–n*, 23*a–n*. The distributed lines 22*a–n*, 23*a–n* are the inputs to each distributed amplifier stage 24*a–n*, 25*a–n*. For purposes of discussion, the character, $a = 1$ and the character, $n$ equals any number greater than 1. This notation applied to the ($a–n$) characters used in conjunction with the description of the distributed lines 22,23 and the distributed amplifiers, 24,25. An optical beam modulation crystal 26 is placed across the output distributed lines of distributed amplifiers 24*a–n*, 25*a–n*. The signal which is to modulate crystal 26 is applied at input 27. A constant current DC source 28 which is in the emitters circuits of transistors 29,30 provides a source of constant DC to transistors 29,30. Transistors 29,30 comprise a push-pull amplifier network which is operated in the Class A mode. A push-pull configuration is required to provide the desired voltage levels to operate the optical beam modulation crystal 26. The amplitude which is required to drive the modulation crystal 26 must be large enough to achieve 75 percent of full modulation. The amplified signal from both outputs of the push-pull amplifier 20 is applied respectively to inputs 31,32 which feed distributed lines 22*a–n* and 23*a–n*, respectively. The use of the multiple distributed amplifier sections provides for both a wideband operation and a power gain consistent with the requirements of the modulator crystal 26.

The function of above amplifier is to supply the proper voltage swing to an optical beam modulation crystal 26. The linear modulator crystal 26 which is employed in this system may be a transverse type such as Potassium Dideuterium Phosphate crystals. This type of crystals was utilized because they are of high optical quality and commercially available. Also, the maximum operating voltage required is not excessive. The transverse operation which is the mode shown in FIG. 2 is the most efficient method because it enables the maximum operating voltage to be reduce by changing the crystal dimensions. For the present crystals the voltage required to swing from full off to full on (no light to full light) is 110 volts. Since these modulators follow a cosine squared relationship between driving voltage and output light energy, linearity requirements set a 60-volt swing as the maximum required from the driver. The parameters of the distributed line are set by the crystals capacitance and the bandwidth required. This capacitance forms part of the distributed line.

The principle advantages of this distributed amplifier over a standard amplifier configurations are greater bandwidth can be obtained at a given gain, because each amplifier section can be operated at a reduced gain and greater bandwidth, with the gain-bandwidth product per section constant. Further, increased power output can be obtained at a given bandwidth, because the total power output equals the sum of the outputs of the individual amplifier sections. This sum can be greater than that available from any currently available semiconductor device. The distributed line configuration makes available a total power output equal to that of the same number of devices operated in parallel, but imposes a shunt capacitive loading equal to that of one stage alone. A six-stage version was originally constructed to demonstrate the feasibility of this design. As this was satisfactory, a 24-section amplifier was then constructed and tested. The driver was proved to have a bandwidth 3 db down at 120 Megahertz, driving 60 volts across the modulator crystal.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. A modulation driver apparatus utilizing a video signal for driving an optical beam modulation crystal over a 100 Megahertz bandwidth comprising in combination:

a push-pull amplifier network having a first and second output terminal and an input terminal, said input terminal receiving a video modulating signal, said push-pull amplifier network amplifying said video modulating signal to provide an amplified video modulating signal, said amplified video modulating signal appearing at said push-pull amplifier network first and second output terminal;

a first distributed amplifier means connected to said first output terminal to further amplify said amplified video modulating signal, said first distributed amplifier means having a plurality of stages; said plurality of stages having a last stage, said last stage having a common emitter transistor output stage; said common emitter transistor output stage being connected to a first output distributed line, said first output distributed line being connected to said common emitter stage by a common base transistor;

a second distributed amplifier means connected to said second output terminal to further amplify said amplified video modulating signal, said second distributed amplifier means having a plurality of stages, said plurality of stages having a last stage, said last stage having a common emitter transistor output stage, said common emitter transistor output stage being connected to a second output distributed line, said second output distributed line being connected to said common emitter stage by a common base transistor; and an optical beam modulation crystal connected between said distribution lines of said first and second distributed amplifiers to receive said amplified video modulating signal.

* * * * *